United States Patent

[11] 3,587,704

[72] Inventor Leo J. Monty
Reading, Mass.
[21] Appl. No. 757,646
[22] Filed Sept. 5, 1968
[45] Patented June 28, 1971
[73] Assignee Artisan Industries Inc.
Waltham, Mass.

[54] THIN FILM PROCESSING METHOD
5 Claims, 3 Drawing Figs.

[52] U.S. Cl. .................................................. 159/6,
202/236, 203/89, 23/294, 260/632, 260/643
[51] Int. Cl. ............................................ B01d 1/24,
B01d 5/00
[50] Field of Search .......................... 159/6 (W),
6 (WH), 49, 13; 202/236; 203/89; 260/643;
23/294

[56] References Cited
UNITED STATES PATENTS
2,360,445  10/1944  Quasebarth ............... 159/43X
2,602,498  7/1952   Overton .................... 159/12
2,927,634  3/1960   Gudheim .................. 159/6W
3,152,947  10/1964  Monick et al. ............ 159/6WX
3,388,733  6/1968   Jackering .................. 159/4E
3,428,530  2/1969   Fauche et al. ............. 203/73X Primary Examiner—Wilbur L. Bascomb, Jr.
Assistant Examiner—J. Sofer
Attorneys—Richard P. Crowley, Philip G. Kely and Richard L. Stevens ABSTRACT: A sodium alkoxide-methanol solution is continuously concentrated to a powder in a horizontally axised thin-film evaporator in a single pass. The vapor flow in the evaporator is concurrent and aids in the removal of the powdered sodium alkoxide from the evaporator where it is discharged into a collection vessel. The vapor stream with entrained sodium alkoxide particles flows through a cyclone separator where the particles are removed from the methanol stream. The removed particles pass to the collection vessel and the methanol stream is condensed.

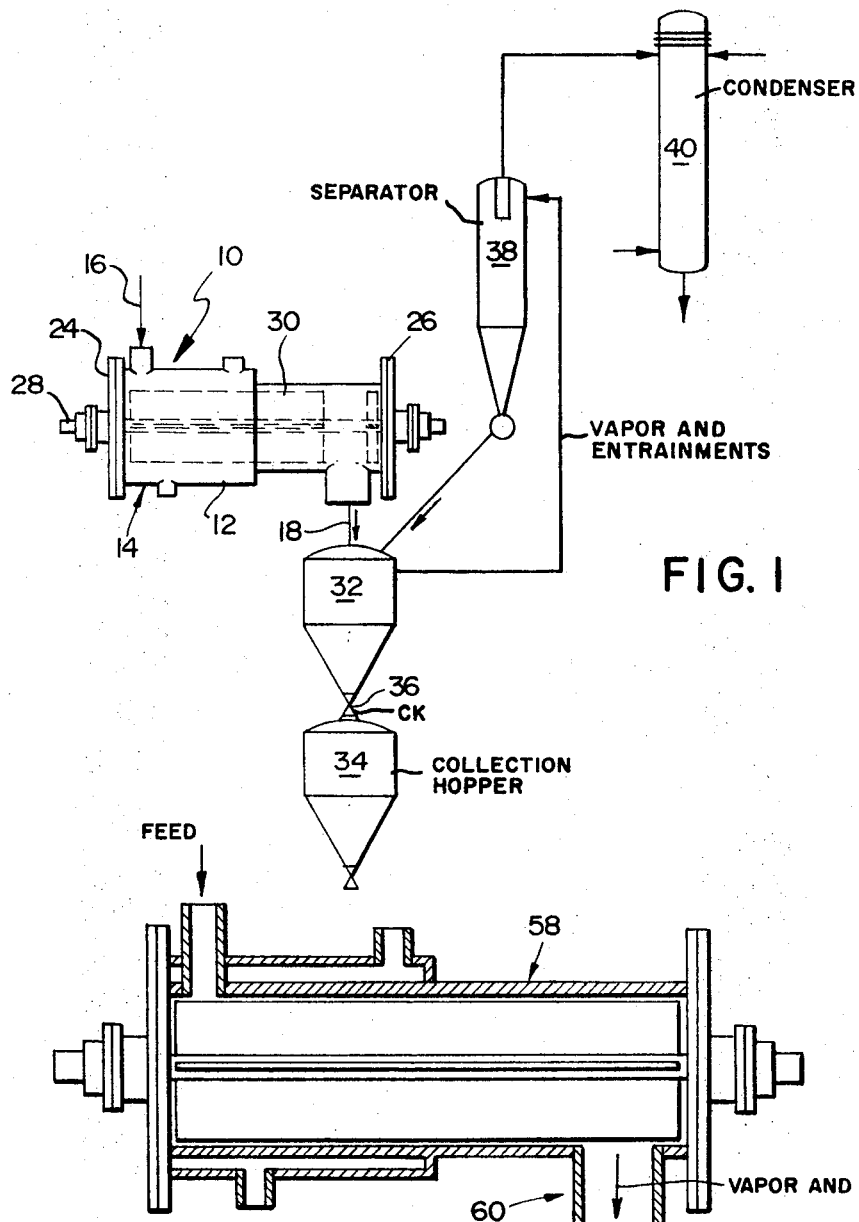
FIG. 1
FIG. 3
INVENTOR
LEO J. MONTY
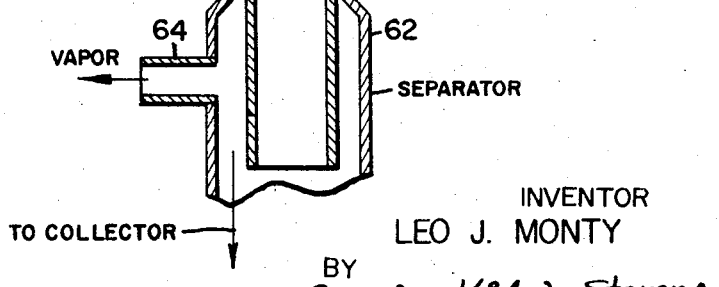
ATTORNEYS

THIN FILM PROCESSING METHOD

BACKGROUND OF THE INVENTION

In the processing, treating or handling or organic resins, polymers or solutions, it is often desirable to remove a solvent or liquid material from a resin, solution emulsion, slurry, suspension or mixture. One means to accomplish the removal of a solvent from a liquid material is through the use of thin-film technology. That is, a thin film of the material to be concentrated is placed on the inner wall of a closed processing chamber to provide a surface for evaporation. Normally, about this chamber is a heat-exchange jacket to introduce heat into the thin film thereby evaporating a solvent as desired. The thin film is generally placed on the walls of the chamber by means of rotor blades or the like, the edges of which are spaced slightly apart from the interior wall of the chamber.

In the processing of material in thin-film apparatus the feed material is generally introduced into one end of the evaporator and the product which is generally a concentrated form of the feed material is removed from the other end, and the vapor created by the evaporation of the solvent is withdrawn from either the product end of the evaporator or from the feed end depending upon whether the vapor flow is countercurrent or concurrent. In some thin-film applications the feed material is dehydrated or dried to a powder, where other types of conventional drying equipment is inappropriate because of cost or the nature of the material.

One vertical thin-film evaporator to dry material is described in U.S. Pat. No. 1,588,029 wherein a feed material is coated on the inner surface of a cylindrical wall by centrifugal action, and dried as it approaches the product outlet. Another vertical thin-film dryer is shown and described in U.S. Pat. No. 3,152,749 wherein the feed material to be dried is placed on the interior wall of a cylindrical chamber by rotor blades, and it is processed downwardly through the processing chamber to the product outlet. These two patents illustrate the drawbacks which are common to vertical thin-film evaporators used for drying in that a portion of the feed material introduced into the processing chamber rather than progressing uniformly along the cylindrical wall often falls directly down to the product outlet whereby the product material comprises a combination of dried product material and feed material or other process material dried to some intermediate point between the original liquid stage of the feed material and the final desired product stage. Product material of this nature creates considerable quality control problems because of the lack of uniformity.

SUMMARY OF THE INVENTION

My invention comprises a method and apparatus for the drying of fluids to a powdered state in a continuous operation to provide a powder of uniform consistency which overcomes the problems of prior art devices. That is, the final product material is not characterized by inconsistencies in uniformity. Fluids as used in this application include vapors which may be condensed directly to the particle state such as materials that sublimate for example, naphthalene wherein the vapors are cooled and pass directly to a solid and liquids which are typically concentrated by evaporation to a melt or slurry and then to a powder. The term powder is intended to include discrete particulate material which may be crystalline or amorphous.

Briefly, my invention comprises a horizontally axised thin-film evaporator wherein a fluid stream typically comprising an alkaline earth alkoxide to be separated from an alcohol and processed to powder form is introduced into the feed end of the evaporator. Of course if desired, a vertical, inclined axised or tapered thin-film evaporator may be used such as described in U.S. Pat. No. 2,927,634. In the processing chamber, the solvent is evaporated and in vaporous form flows in the same direction as the material being processed, that is concurrent. The powdered product material is discharged and the vapor stream carrying the particles passes to a separator such as a cyclone-separator, centrifugal-separator, bag filter, electrostatic precipitator or any conventional apparatus for separating particles from vapor streams. Also my invention may function in combination with other auxiliary equipment such as condensers for recovering the solvent produced by the powdering of the solute and one or more additional dryers to bring the powder to the desired degree of dryness.

Generally, there is just one outlet for both the powder and the vapor and in this way the vapor stream carries the particles out of the thin-film evaporator and reduces the need for multiple ports or outlets. In operation the feed material is placed in thin-film form on the interior wall of the processing chamber and as it progresses toward the product outlet it is continually concentrated until it turns to powdered form and is discharged.

BRIEF DESCRIPTION OF THE DRAWINGS

FIG. 1 is a schematic illustration of my invention in its preferred embodiment;

FIGS. 2 and 3 are schematic illustrations of my invention in combination with auxiliary equipment in alternative embodiments.

DESCRIPTION OF THE PREFERRED EMBODIMENTS

Figure 2:
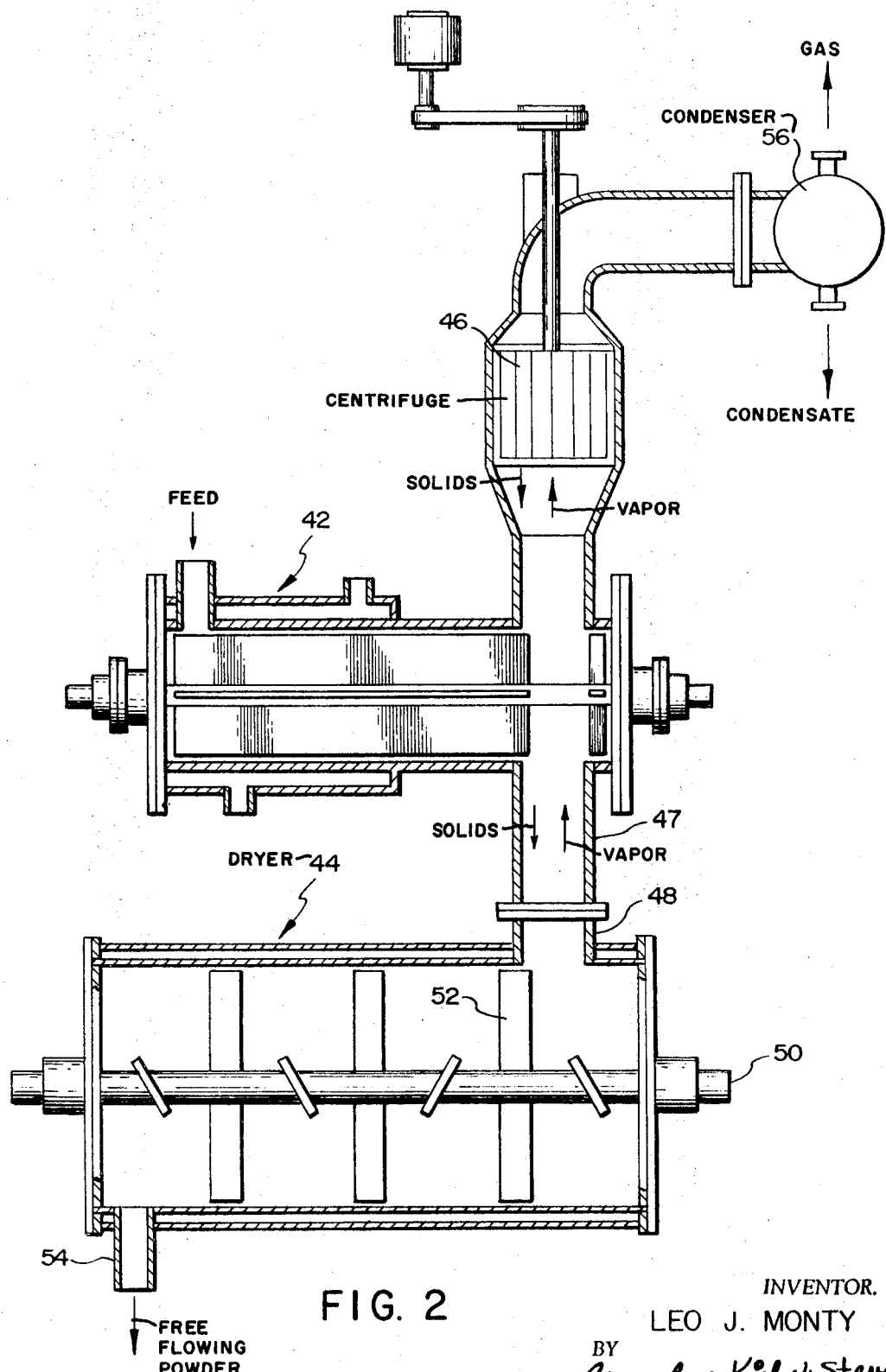

FIG. 1 shows generally a horizontally axised cylindrical-type evaporator 10 which comprises a closed cylindrical chamber 12 having interior walls and surrounded on all or part of its length by a temperature control jacket 14 which is adapted for the introduction of a heating or cooling heat exchange fluid such as steam, cold water and the like. The chamber 12 is further characterized by a feed inlet 16 for the introduction by pump, gravity or by vacuum of a feed material to be processed through the evaporator, and a product outlet or discharge nozzle 18 at the opposite end thereof for the removal of the vapor stream and the powdered material. Closing heads 24 and 26 are secured to either end of the chamber 12 and support a horizontally inclined central axis-tubelike rotor 28 which extends from one to the other end of the chamber 12. The rotor 28 is driven by a motor or other means (not shown) and generally extends outwardly from each end of the closing heads.

Extending axially outward from the rotor shaft are a plurality of generally four or more radial rotor blades 30, the blade tips which extend onto a small but generally uniform closely spaced relationship with respect to the interior walls of the chamber 12, so that upon rotation of the rotor shaft 28 the rotor blades provide a thin-wiped turbulent film of the process material on the interior wall of the chamber 12. Downstream of the product outlet in communication therewith are two collecting hoppers 32 and 34 in serial relationship. A check valve 36 is disposed between the two hoppers which allows them to function either alone or in combination. In communication with the first hopper is a cyclone separator 38 to remove any powdered material which still may be entrained in the vapor stream coming from the hopper 32. In communication with the separator 38 is a condenser 40 to recover the vapor stream.

The operation of my invention will be described in reference to the powdering of an alkaline alkoxide containing an alkaline metal such as K, Ce, Na etc. from an oxygen containing organic solvent such as an aldehyde, ketone or an alkonol such as a lower chained $c_1-c_5$ alcohol like methanol propanol, etc. Specifically sodium methoxide in an alcohol such as methanol is introduced into the feed inlet 16 by gravity under vacuum or pump at an ambient temperature. The system is maintained at a vacuum of about 5 mm. to 50 mm. of Hg say for example, 25 mm. Hg. The rotor shaft 28 and the rotor blades 30 are rotated at high speed during the processing to form a thin film of the feed material against the interior wall of the chamber 12. A heat exchange fluid such as steam is introduced into the temperature control jacket 14 between about 100° F. and 600° F. say, for example, 340° F. whereby the thin film on the interior wall is placed in a heat exchange relationship with the steam in the heating jacket to effect an evaporation of the methanol from the feed end to the product end of the evaporator. The feed material in thin-film form increases in concentration and becomes a slurry and then it changes to crystalline form.

A portion of the powdered product material is discharged by gravity after it passes off the ends of the rotor blades which are adjacent the product outlet, while any remaining powdered material which may be entrained in the vapor flow also passes out the same product outlet. Thus, the vapor stream flowing out the product outlet 18 insures that any entrained particles are carried out the product outlet and accordingly prevents these materials from remaining in the evaporator.

Most of the product material settles to the bottom of the hopper 32 and passes through the check valve 36 which is open and into the bottom of the collecting hopper 34. The vapor stream with some entrained particles passes to the top of the cyclone separator 38. The separator removes the entrained particles and discharges them back into the top of the hopper 32. The methanol in vaporous form then passes to the condenser 40 where it is cooled and collected for further use.

If desired, the final product in powdered form may be removed continuously or intermittently. For example, after the hopper 34 has been filled to the desired level with the product material the check valve 36 may be closed and the product material from the hopper 34 removed, while the product material continues to fill hopper 32. Upon removal of the material from the hopper 34 the check valve 36 may again be opened.

FIG. 2 shows an alternative embodiment of my invention wherein a horizontally axised thin-film evaporator 42 similar to the evaporator described and shown in FIG. 1 functions in combination with an auxiliary dryer 44 and a cyclone separator or centrifuge 46. In some instances it is not feasible to dry a material fully in one pass through the thin-film evaporator. For example, under certain operating conditions to dry a powder to the prescribed degree say for example 98–99 percent dry, requires too high a discharge temperature which may scorch or thermally degrade the product material. Accordingly, in this embodiment the product material is directly discharged from the product outlet 47 of the first evaporator 42 directly into the inlet 48 of the second evaporator 44. As shown, the second evaporator comprises a rotor shaft 50 having a plurality of paddle blades 52 thereon. These blades keep the material sufficiently agitated until it is finally dried to the desired state and is discharged as a dry free-flowing powder from the product outlet 54.

The vapor stream from the evaporator 42 flows directly upward into the cyclone separator 46 with the entrained particles. The vapor stream created by the additional drying in evaporator 44 combines with the vapor stream from evaporator 44 and flows directly into the cyclone separator 46 as it is clearly shown in the drawing and as indicated by the arrows. The material separated from the cyclone separator 46 is then discharged back into the evaporator 42 and then into the evaporator 44 and out the product outlet 54. The vapor stream from the separator then passes to the condenser 56 where it is recovered.

My invention in its simplest embodiment is shown in FIG. 3 where a horizontally axised thin-film evaporator such as shown in FIG. 1 as 10 and in FIG. 2 as 42 has one outlet 60 for both the powder and vapor stream. The product outlet 60 of the evaporator 58 discharges directly into a simplified separator 62 where the powdered material flows downwardly to a collecting vessel (not shown) and the vapor rises and passes through a vapor outlet 64.

Although my invention has been described and shown in reference to the crystallization of sodium methoxide from a sodium methoxide-methanol solution, it is obvious it may be used for powdering amorphous as well as crystalline materials. Further, other types of separators may be used in combination with my evaporator as well as various forms of other auxiliary equipment.

I claim:
1. A process for the powdering of a liquid material which comprises:
    a. forming a wiped thin film of liquid feed material on the interior wall of a generally horizontal cylindrical chamber;
    b. placing a fluid into an indirect heat exchange relationship with said liquid thin-film material to evaporate a portion of said liquid material, thereby producing a vaporous stream;
    c. converting said liquid thin-film material into a powdered material by progressively increasing the concentration of said liquid thin-film material;
    d. flowing the vaporous stream created by the concentration of the liquid thin-film material in generally the same direction as the liquid thin film being processed whereby a portion of the powdered material is entrained in the vapor stream;
    e. passing said entrainments to a separating zone to separate the same;
    f. discharging the powdered material not entrained in said vapor stream from the chamber; and
    g. collecting the powdered materials.
2. The process of claim 1 which includes condensing the vapor stream after the entrainments have been separated.
3. The process of claim 1 wherein the feed material comprises an alkaline-alkoxide and an oxygen containing solvent.
4. The process of claim 3 wherein the alkaline alkoxide is sodium methoxide and the oxygen containing organic fluid is methanol.
5. A process for the powdering of sodium methoxide from a sodium methoxide-methanol solution which comprises:
    a. forming a wiped turbulent thin film of the liquid feed material on the interior wall of a generally cylindrical chamber;
    b. placing a heat exchange fluid at a temperature of from about 100–600°$B$ F. into an indirect heat exchange relationship with the thin-film material to evaporate at least a portion of the methanol thereby producing a vaporous methanol stream;
    c. converting the sodium methoxide into powder form by progressively increasing the concentration of said sodium methoxide;
    d. flowing the vaporous methanol created by the concentration of the feed material in generally the same direction as the thin-film being processed whereby a portion of the powdered sodium methoxide is entrained in the vapor stream;
    e. passing said entrainments to a separating zone to separate the same;
    f. discharging the powdered sodium methoxide not entrained in said vapor stream from the chamber;
    g. condensing the vaporous methanol after the entrained sodium alkoxide has been separated; and
    h. collecting the sodium methoxide.